Patented Oct. 7, 1924.

1,510,521

UNITED STATES PATENT OFFICE.

FRED M. LOCKE, OF VICTOR, NEW YORK.

GLASS.

No Drawing. Application filed September 16, 1916, Serial No. 120,555. Renewed April 3, 1922. Serial No. 549,165.

*To all whom it may concern:*

Be it known that I, FRED M. LOCKE, a citizen of the United States of America, and resident of Victor, in the county of Ontario, in the State of New York, have invented new and useful Improvements in Glass, of which the following is a full, clear, and exact description.

This invention relates to certain improvements in glass.

The object of the invention is to produce a glass which has very high insulating quality with a very low coefficient of expansion and great stability.

The insulating quality is increased through the inclusion of boron material existing in the glass in the form of boron oxide, and I find that the addition of small amounts of some of the metals, preferably in the form of metal salts or compounds of barium, strontium, calcium, and magnesium, produces stability in the glass and lowers the melting point materially, thereby permitting economic manufacture, and I find that a glass which is high in silica and boric oxide with a small amount of alumina and with small amounts of alkalies and some of the metal compounds or salts above-mentioned, produces a glass which has a very low coefficient of expansion, great stability and the highest insulating qualities. The above named metallic elements may be known for the purpose of this specification as opacifying elements.

As a specific illustration of this invention, I desire to disclose and claim herein a glass of the following analysis:

$SiO_2$ 78.73%—CaO 1.33%—$Al_2O_3$ and FeO .86%—MgO traces—$Na_2O$ 4.24%—$K_2O$ .62%—Mn traces—$B_2O_3$ 14.22%.

Such a glass is highly efficient for the purpose described and is peculiarly adapted for high voltage currents and high frequency.

The expansion coefficient of the above glass is approximately .0000032.

Although I have described and disclosed a specific composition as illustrative of the invention herein, I do not desire to limit myself to the same, as various changes and substitutions may obviously be made in the exact proportions and by way of equivalent materials without departing from the spirit of this invention, as set forth in the appended claims.

By the use of the term, boro-silicate glass, it is intended to cover a glass of low coefficient of expansion developed by the introduction of a boron compound as a flux and having a high silica content. By the use of the expression, small amount of alkaline earth, is meant an amount of alkaline earth which will not materially increase the coefficient of expansion of the finished glass.

What I claim is:

1. A glass containing over 78% of silica, under 5% of alkali, alumina, an alkali earth, and boric oxide, and having a coefficient of expansion substantially .0000032.

2. A glass containing over 78% of silica, under 5% of alkali, alumina, magnesium oxide, and boric oxide.

3. A glass of substantially the following analysis: $SiO_2$ 78.73%—CaO 1.33%—$Al_2O_3$ and FeO .86%—MgO traces—$Na_2O$ 4.24%—$K_2O$ .62%—$B_2O_3$ 14.22%.

4. A boro silicate glass containing magnesia, and under 5% of alkali.

5. A boro silicate glass containing magnesia, alumina, and under 5% of alkali.

6. A boro silicate glass having a high silica content and containing alumina, magnesia, and under 5% of alkali.

7. A boro silicate glass insulator containing over 78% of silica, under 5% of alkali, alumina, and a small amount of alkaline earth.

In witness whereof I have hereunto set my hand this 11th day of September, 1916.

FRED M. LOCKE.